United States Patent
Seo

(10) Patent No.: US 7,729,424 B2
(45) Date of Patent: *Jun. 1, 2010

(54) APPARATUS AND METHOD FOR JUDGING LOST BLOCK CHARACTERISTIC IN VIDEO PROCESSING SYSTEM

(75) Inventor: Kwang-Deok Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1180 days.

This patent is subject to a terminal disclaimer.

(21) Appl. No.: 10/964,739

(22) Filed: Oct. 15, 2004

(65) Prior Publication Data

US 2005/0084017 A1    Apr. 21, 2005

(30) Foreign Application Priority Data

Oct. 16, 2003    (KR)    ............ 10-2003-0072251

(51) Int. Cl.
 *H04N 7/12* (2006.01)
(52) U.S. Cl. ............ 375/240.16; 375/240.24; 375/240.01; 348/700
(58) Field of Classification Search ............ 375/240.16, 375/240.24, 240.01; 348/700
See application file for complete search history.

(56) References Cited

U.S. PATENT DOCUMENTS

| | | | |
|---|---|---|---|
| 5,247,363 A | | 9/1993 | Sun et al. |
| 5,410,553 A | * | 4/1995 | Choon ............ 714/747 |
| 5,621,467 A | * | 4/1997 | Chien et al. ............ 375/240.15 |
| 5,912,707 A | * | 6/1999 | Kim ............ 375/240.16 |
| 6,141,381 A | | 10/2000 | Sugiyama |
| 6,590,934 B1 | | 7/2003 | Kim |
| 7,110,454 B1 | * | 9/2006 | Chakraborty ............ 375/240.16 |
| 2005/0033505 A1 | * | 2/2005 | Zatz ............ 701/117 |

FOREIGN PATENT DOCUMENTS

EP    0 557 684 A    9/1993

(Continued)

OTHER PUBLICATIONS

Tao Chen et al., "Error Concealment Using Refined Boundary Matching Algorithm"; Information Technology: Research and Education 2003. Proceedings ITRE2003. International Conference on Aug. 11-13, 2003, Piscataway, NJ, USA, IEEE, pp. 55-59 XP010684972.
European Search Report dated Nov. 8, 2005.
Chinese Office Action dated Jul. 28, 2006.

(Continued)

*Primary Examiner*—Andy S Rao
*Assistant Examiner*—Geepy Pe
(74) *Attorney, Agent, or Firm*—KED & Associates, LLP

(57) ABSTRACT

A method for judging a lost block characteristic in a video processing system including certifying whether a lost block exists among transmitted video blocks, calculating a temporal difference $cost_1$ between neighborhood pixels of the lost block in a present frame and a previous frame, and calculating a motion vector distribution value $cost_2$ of peripheral blocks of the lost video block. The method also includes comparing the temporal difference $cost_1$ and the motion vector distribution value $cost_2$ with preset threshold values, and determining a characteristic of the lost block based on a result of the comparison. The automatically judged characteristic of the lost block is utilized as information for recovering the lost block to thereby reproduce a recovery video close to the original video.

17 Claims, 8 Drawing Sheets

FOREIGN PATENT DOCUMENTS

| | | |
|---|---|---|
| GB | 2 308 766 A | 7/1997 |
| JP | 09-187016 | 7/1997 |
| JP | 9-247681 | 9/1997 |
| KR | 00032572 | 6/2000 |

OTHER PUBLICATIONS

Japanese Search Report (and English-language translation) dated Apr. 21, 2008.
European Office Action dated Aug. 12, 2009.

* cited by examiner

APPARATUS AND METHOD FOR JUDGING LOST BLOCK CHARACTERISTIC IN VIDEO PROCESSING SYSTEM

CROSS-REFERENCE TO A RELATED APPLICATION

This application claims priority to Korean Patent Application No. 72251/2003, filed on Oct. 16, 2003, the entire contents of which is hereby incorporated in its entirety.

BACKGROUND OF THE INVENTION

1. Field of the Invention

The present invention relates to a video processing technique, and more particularly to an apparatus and method for automatically judging a characteristic of a lost block when transmitting a digital video.

2. Background of the Related Art

Recently, a technique for recovering various video signals transmitted through communication media without an error are becoming more important. The video includes several frames having different scene characteristics and motion degrees. Further, the frame includes macroblocks having a size of 16×16 pixels corresponding to a video coding unit.

The video is compressed using a discrete cosine transform (DCT), a variable length coding method, a motion compensation coding method, etc. and then transmitted. If a block of the video is lost due to an error generated during the coding process or the transmission process through a transmission channel, a quality of the recovered video is degraded.

Currently several error concealment techniques are used to recover a lost block. However, the current methods do not satisfy the needs of the communication industry.

SUMMARY OF THE INVENTION

Accordingly, one object of the present invention is to at least address the above and other noted problems.

Another object of the present invention is to automatically judge a characteristic of a video block lost during transmission and provide information for recovery about the lost block.

To achieve these and other advantages and in accordance with the purpose of the present invention, as embodied and broadly described herein, the present invention provides a novel lost block characteristic judging apparatus in a video processing system including a lost block detection unit for determining whether a lost block exists among transmitted video blocks, a pixel difference calculation unit for calculating a temporal difference $cost_1$ between neighborhood pixels in a present frame where the lost block is generated and a previous frame, and a distribution value calculation unit for calculating a motion vector distribution value $cost_2$ of peripheral blocks of the lost block. Also included is a block characteristic determination unit for judging a characteristic of the lost block by comparing the temporal difference $cost_1$ and the motion vector distribution value $cost_2$ with preset threshold values.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE OF THE INVENTION

Figure 1:
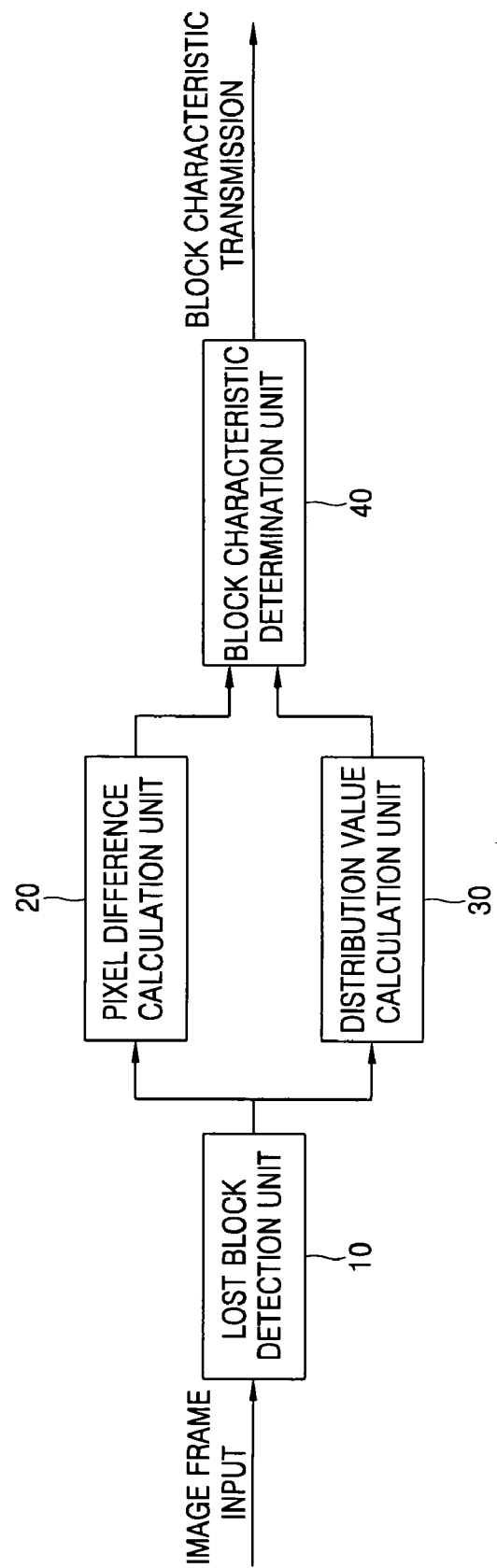
FIG. 1 is a block diagram illustrating of a lost block characteristic judging apparatus in a video processing system according to the present invention.

Referring now to the drawings, wherein like reference numerals designate identical or corresponding parts throughout the several views, the present invention will be described.

FIG. 1 is a block diagram of a lost block characteristic judging apparatus in an video processing system according to the present invention. As shown, the apparatus includes a lost block detection unit 10 for determining whether a lost block exists among transmitted video blocks; a pixel difference calculation unit 20 for calculating a temporal difference $cost_1$ between neighborhood pixels in a present frame and a previous frame when the lost block detection unit 10 detects a lost block; a distribution value calculation unit 30 for calculating a motion vector distribution value $cost_2$ of peripheral blocks of the lost block; and a block characteristic determination unit 40 for judging a characteristic of the lost block by comparing the temporal difference $cost_1$ and the motion vector distribution value $cost_2$ with preset threshold values.

The video can then be recovered using an error concealment technique suitable for a corresponding lost block with reference to the characteristic of the lost block judged by the block characteristic determination unit 40. That is, a characteristic of the lost block is accurately judged to select the most suitable error concealment technique.

Figure 2:
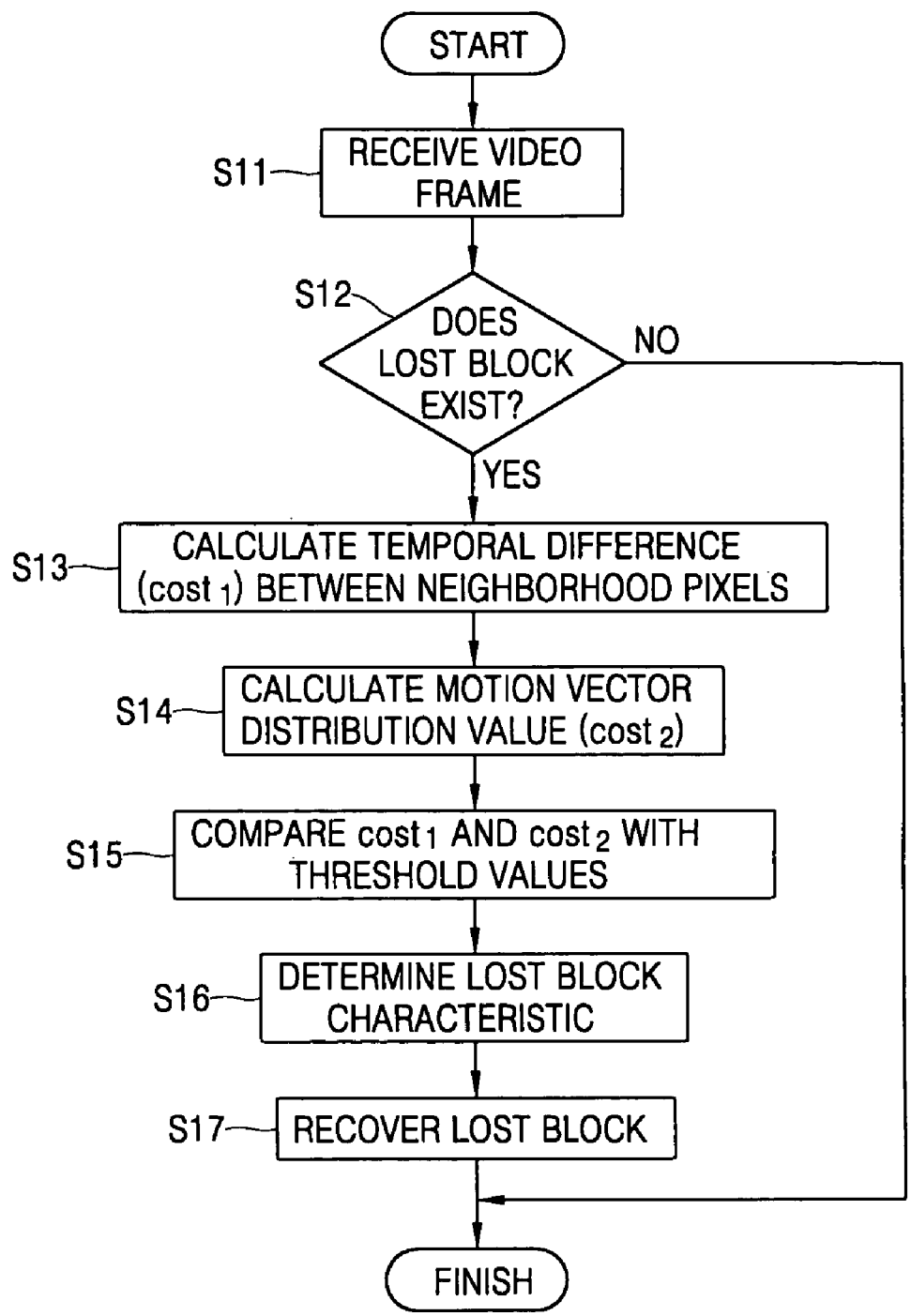
FIG. 2 is a flowchart showing a lost block characteristic judging method in an image processing system according to the present invention.

Next, FIG. 2 is a flowchart showing a lost block characteristic judging method according to the present invention. First, when a video frame is transmitted from a transmission side (not shown) (S11), the lost block detection unit 10 judges whether a lost block exists in the video frame (S12).

If a lost block is detected in the image frame, a temporal difference $cost_1$ is calculated between neighborhood pixels of the lost block in the present frame and neighborhood pixels existing in the previous frame at the same position as the present frame (S13). Next, a motion vector distribution value $cost_2$ of peripheral blocks of the lost block in the video frame is calculated (S14), and the temporal difference $cost_1$ and the motion vector distribution value $cost_2$ are compared with preset threshold values (S15).

Using the comparison between the calculated values $cost_1$, $cost_2$ and the preset threshold values, a characteristic of the lost block is determined (S16). Subsequently, with reference to the characteristic of the lost block, the corresponding lost block is recovered (S17). As described above, in the present invention, the temporal difference between neighborhood pixels and the motion vectors are used to judge the characteristic of the lost block.

Hereinafter, the method for calculating the temporal difference $cost_1$ between neighborhood pixels and the motion vector distribution value $cost_2$ will be explained with reference to FIGS. 3 to 13.

In one example of the present invention, the characteristics of the lost block can be largely classified into 5 types, that is, 'scene change', 'object moving', 'no movement', 'camera moving', and 'otherwise' types.

The 'scene change' type indicates a block having a scene conversion between frames, the 'object moving' type indicates a block having a moving object without a certain direction, the 'no movement' type indicates a block having nearly no movement such as a background of a stationary image of a camera, the 'camera moving' type indicates a block having an image of which movement is similar because a camera itself moves, and the 'otherwise' type indicates a block which does not belong to the other four types.

Figures 3, 4:
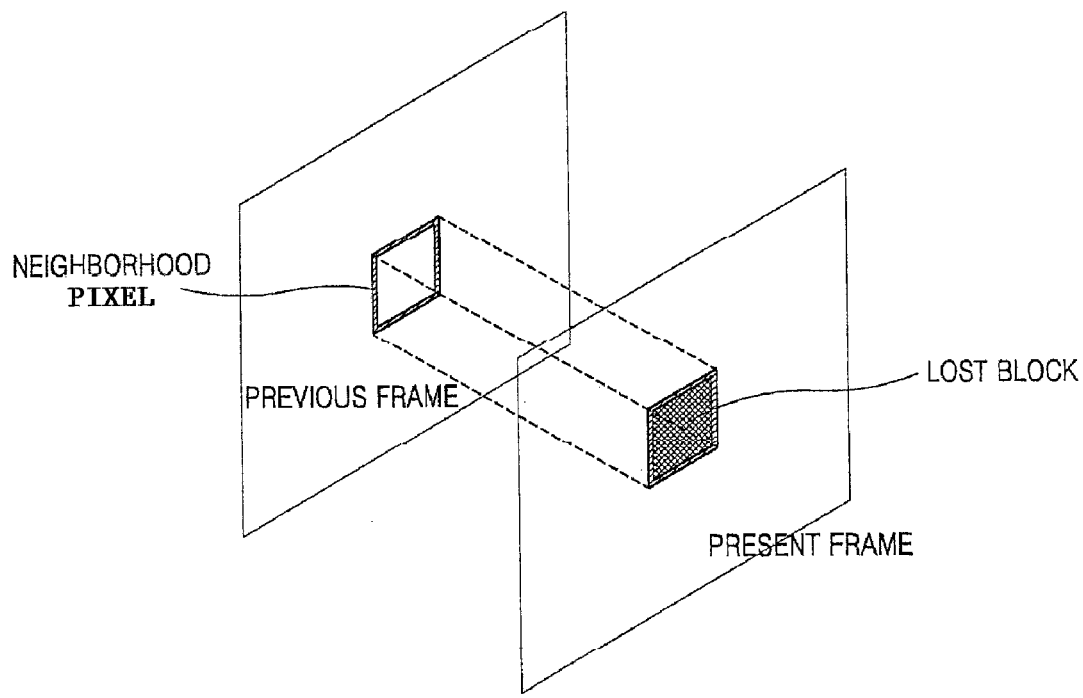
FIG. 3 is an overview showing a temporal difference of between pixels in a present frame and a previous frame.
FIG. 4 is an overview showing a lost block and motion vectors of peripheral blocks.

First, the method for calculating the temporal difference $cost_1$ between neighborhood pixels of the lost block will be explained. FIG. 3 illustrates the temporal difference between neighborhood pixels of the lost block in the present frame and previous frame existing at the same position as that of the present frame, in which the oblique lines denote neighborhood pixels of the lost block in the present frame and in the previous frame.

Generally, a macroblock having a size of 16×16 includes 64 (16×4) neighborhood pixels at the periphery thereof. The number of neighborhood pixels having a temporal difference with the previous frame which exceeds a predetermined threshold value is defined as a cost function.

The cost function can be expressed as the following formulas 1 and 2.

$$cost_1 = \sum_{i=1}^{64} Diff_i \quad \text{(formula 1)}$$

$$Diff_i = \begin{cases} 1 & \text{if } |curr_i - prev_i| \geq Threshold_{Diff} \\ 0 & \text{otherwise} \end{cases} \quad \text{(formula 2)}$$

Herein, the $curr_i$ denotes a value of a neighborhood pixel of the lost block in the present frame, and the $prev_i$ denotes a value of a neighborhood pixel of the lost block in the previous frame at the same position as the present frame.

A small cost function $cost_1$ means that a significant change is not generated between the lost block in the present frame and the block in the previous frame existing at the same position as the present frame. However, a large cost function $cost_1$ (i.e., a large temporal difference with the previous frame) means that a motion vector of the lost block is significant or a scene conversion was generated.

Therefore, the cost function $cost_1$ serves as a basis for determining a characteristic of the lost block by comparing the cost function with a predetermined threshold value. That is, if $cost_1$ is less than the threshold value, a determination is made that the temporal difference between the present frame and the previous frame is not significant and the motion vector of the lost block is small. On the contrary, if $cost_1$ is greater than the threshold value, a determination is made that the motion vector of the lost block is great or a scene conversion was generated.

The method for calculating the cost function $cost_2$ using motion vectors of the peripheral blocks of the lost block will now be explained. FIG. 4 illustrates a lost block and motion vectors of the peripheral blocks of the lost block. A motion vector of the lost block is closely correlative with that of the peripheral blocks, so that a characteristic of the lost block can be judged using motion vectors of the peripheral blocks.

That is, if the motion vectors of the peripheral blocks have nearly constant sizes, it can be judged a movement direction of the peripheral blocks is substantially constant and the lost block also has a movement in the same direction. However, if the sizes of the motion vectors of the peripheral blocks are not constant, the movement of the lost block cannot be easily predicted.

Accordingly, the cost function $cost_2$ can be expressed with the following formulas 3 and 4 using a distribution of the motion vectors of the peripheral blocks.

$$cost_2 = \sum_{i=1}^{7} MV_i^2 - \left[\sum_{i=1}^{7} MV_i\right]^2 \quad \text{(formula 3)}$$

$$MV_i = \sqrt{MV_{ix}^2 + MV_{iy}^2} \quad \text{(formula 4)}$$

Here, the $MV_{ix}$ and $MV_{iy}$ denote a horizontal ingredient and a vertical ingredient of $MV_i$, respectively. The formula 3 is for obtaining the distribution value of the motion vectors.

A small cost function $cost_2$ means that seven peripheral motion vectors $MV_1 \sim MV_7$ have similar values, and a large cost function $cost_2$ means that the motion vectors are widely distributed and thereby the movement of the peripheral blocks is not constant.

Therefore, a characteristic of the lost block can be judged by comparing the cost function $cost_2$ with a predetermined threshold value. Further, a suitable threshold value may be determined experimentally. To determine the threshold value, the relations between four block characteristics and the cost function may be used.

Figure 5A:
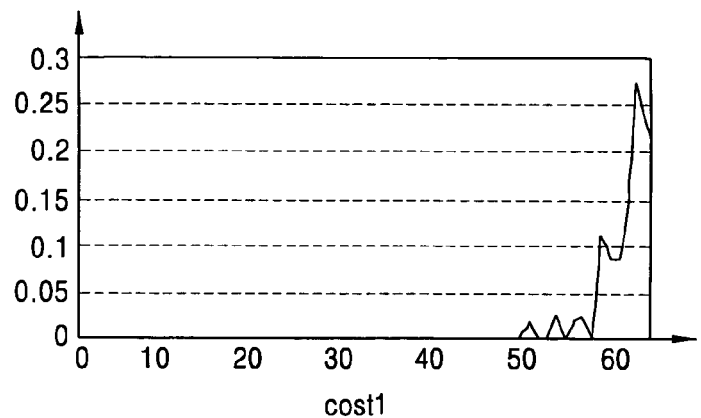
FIGS. 5A and 5B are distribution charts showing a cost function of blocks having a 'scene change' characteristic.
Figure 5B:
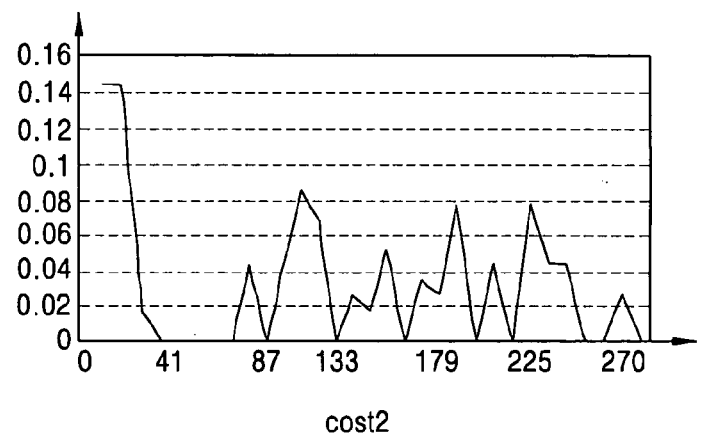
Figure 6:
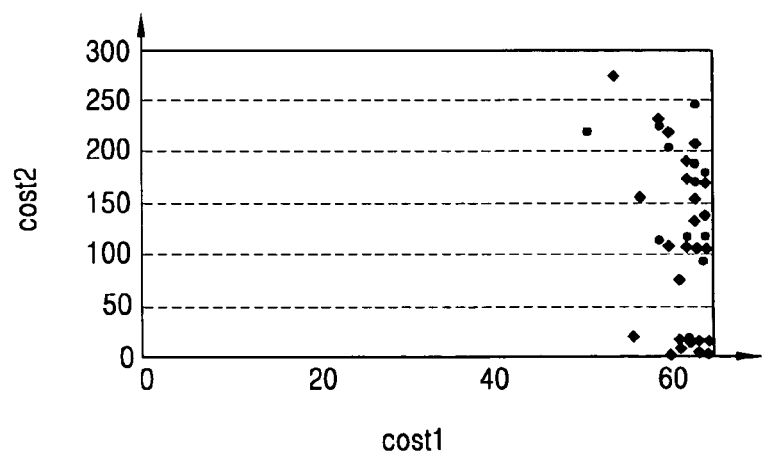
FIG. 6 is a graph showing a correlativity between the cost functions of FIGS. 5A and 5B.

Next, FIGS. 5A and 5B are distribution charts showing a cost function of blocks having a 'scene change' characteristic, and FIG. 6 is a graph showing a correlativity between the cost functions of FIGS. 5A and 5B. In more detail, FIG. 5A is a graph showing a distribution of the cost function $cost_1$, which is the temporal difference between neighborhood pixels. As shown, most of the cost functions $cost_1$ exceed 60. Further, FIG. 5B is graph showing a distribution value $cost_2$ of the motion vectors adjacent to the lost block, in which even cost functions $cost_2$ are shown without a bias to one value.

As shown in FIG. 6, the 'scene change' block depends on the cost function $cost_1$, which is the temporal difference between neighborhood pixels.

The following table 1 shows average values and standard deviations of the $cost_1$ and the $cost_2$, in which the temporal difference $cost_1$ has a small standard deviation to be biased to the periphery of the average value 61.53, whereas the distribution value $cost_2$ has a large standard deviation to show an even distribution.

TABLE 1

|  | $cost_1$ | $cost_2$ |
|---|---|---|
| Average value | 61.53 | 118.95 |
| Standard deviation | 2.71 | 87.10 |

Accordingly, when the lost block is judged to be a block having the 'scene change' characteristic, only the cost function $cost_1$ is used and a corresponding threshold value is defined as 60. That is, the judgment of the block having the 'scene change' characteristic is performed using the following formula 5.

$$cost_1 \geq 60 \qquad \text{(formula 5)}$$

Figure 7A:
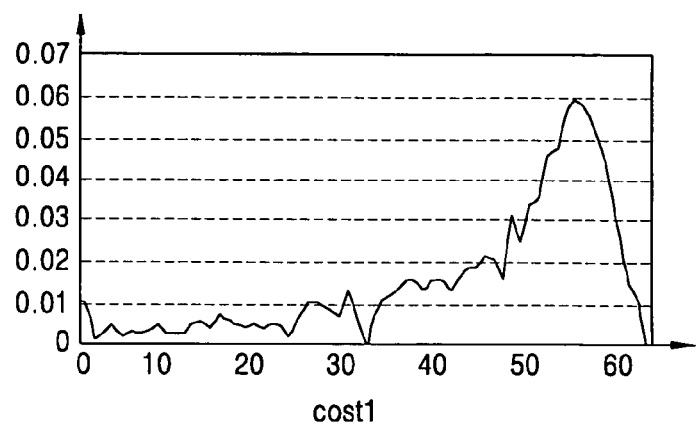
FIGS. 7A and 7B are distribution charts showing a cost function of blocks having a 'camera moving' characteristic.
Figure 7B:
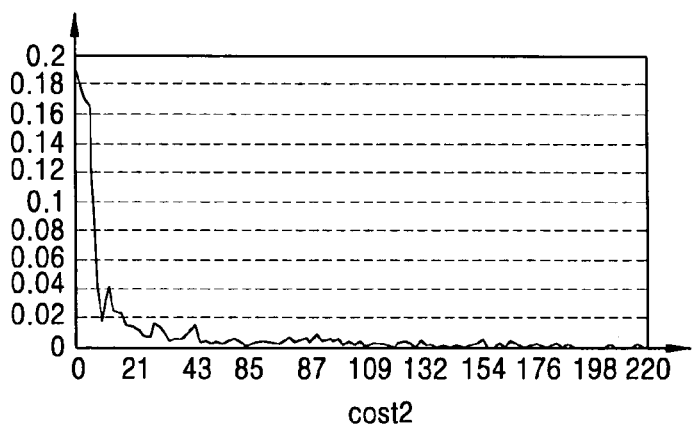
Figure 8:
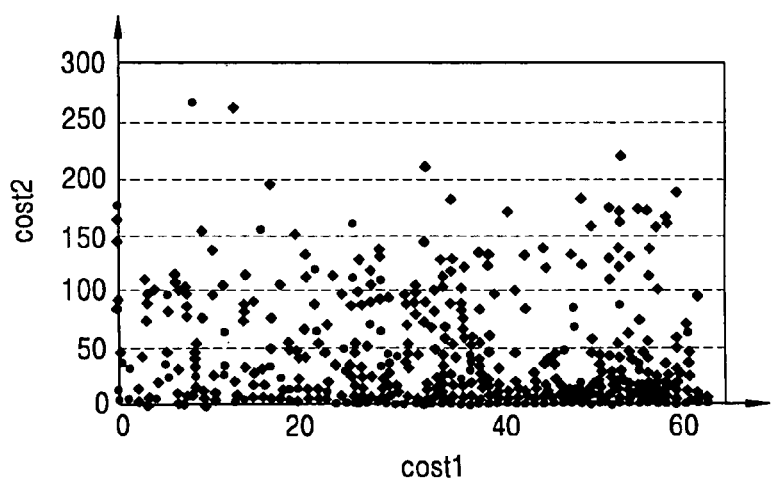
FIG. 8 is a graph showing a correlativity between the cost functions of FIGS. 7A and 7B.

Next, FIGS. 7A and 7B are distribution charts showing cost functions of blocks having a 'camera moving' characteristic, and FIG. 8 is a graph showing a correlativity between the cost functions of FIGS. 7A and 7B. As shown in FIG. 7A, the cost function $cost_1$ is widely distributed verses the blocks having the 'scene change' characteristic, but most of the $cost_1$ exceeds 30. On the contrary, referring to FIG. 7B, most of the cost function $cost_2$ are less than or equal to 50.

Further, the blocks having the 'camera moving' characteristic have nearly constant cost functions $cost_2$ because the entire movement of the frame is constant and thereby the motion vectors of the peripheral blocks have nearly similar values.

Referring to FIG. 8, the cost function $cost_1$ is mainly biased toward larger values and the cost function $cost_2$ is mainly biased to smaller values. Thus, the judgment of the block having the 'camera characteristic' is performed using the following formula 6.

$$cost_1 \geq 30, cost_2 \leq 50 \qquad \text{(formula 6)}$$

Figure 9A:
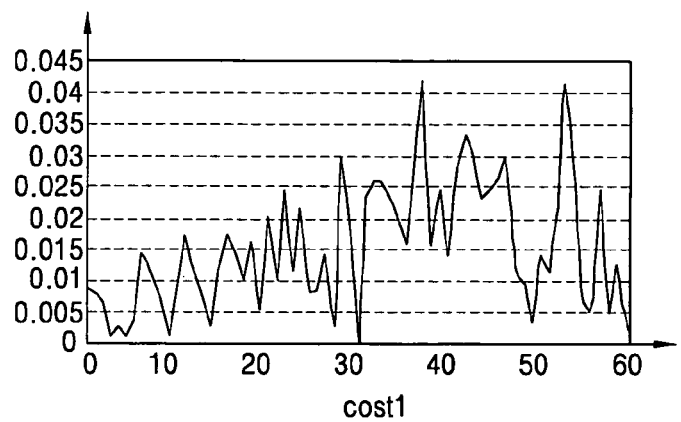
FIGS. 9A and 9B are distribution charts showing a cost function of blocks having an 'object moving' characteristic.
Figure 9B:
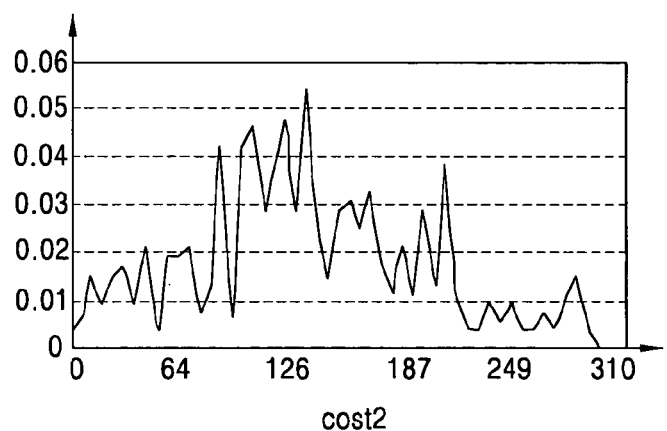
Figure 10:
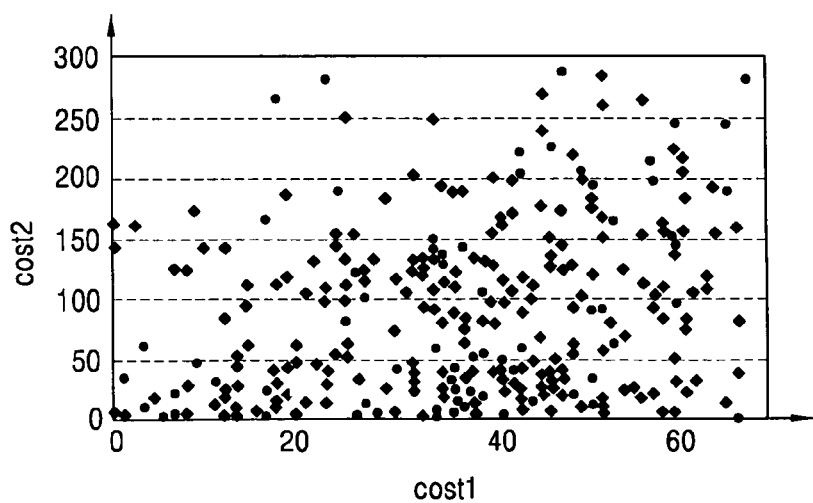
FIG. 10 is a graph showing a correlativity between the cost functions of FIGS. 9A and 9B.

Next, FIGS. 9A and 9B are distribution charts showing cost functions of blocks having an 'object moving' characteristic, and FIG. 10 is a graph showing a correlativity between the cost functions of FIGS. 9A and 9B.

As shown in FIGS. 9A and 9B, the cost functions $cost_1$ and the cost function $cost_2$ are evenly distributed. Further, the cost function $cost_1$ has large values for costs greater than 30, and the cost function $cost_2$ has a lot of data at the periphery of 100. As shown, the cost functions are not biased to a certain value, but the distribution of the motion vectors is anticipated to be wide according to a characteristic of the 'object moving' type. Referring to FIG. 10, data are biased to mainly large values in the cost functions $cost_1$ and $cost_2$.

Therefore, the judgment of the blocks having the 'object moving' is performed using the following formula 7.

$$cost_1 \geq 30, cost_2 \leq 150 \qquad \text{(formula 7)}$$

Figure 11A:
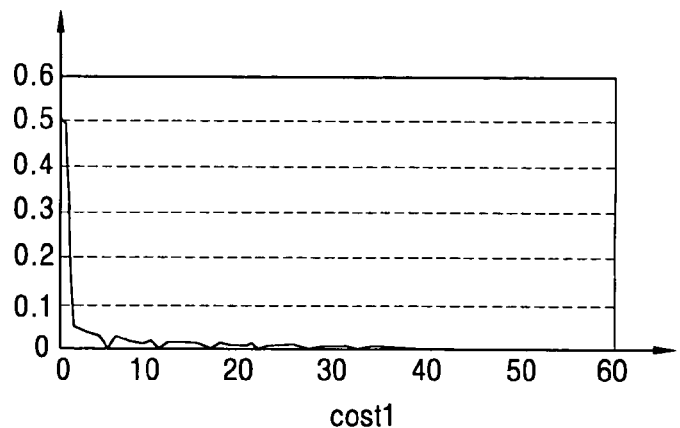
FIGS. 11A and 11B are distribution charts showing a cost function of blocks having a 'no movement' characteristic.
Figure 11B:
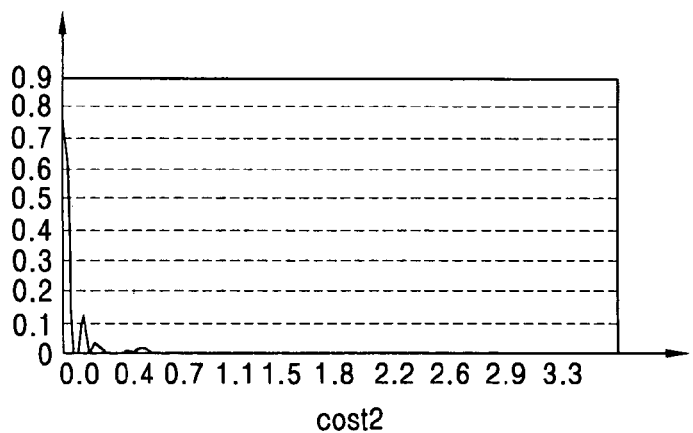
Figure 12:
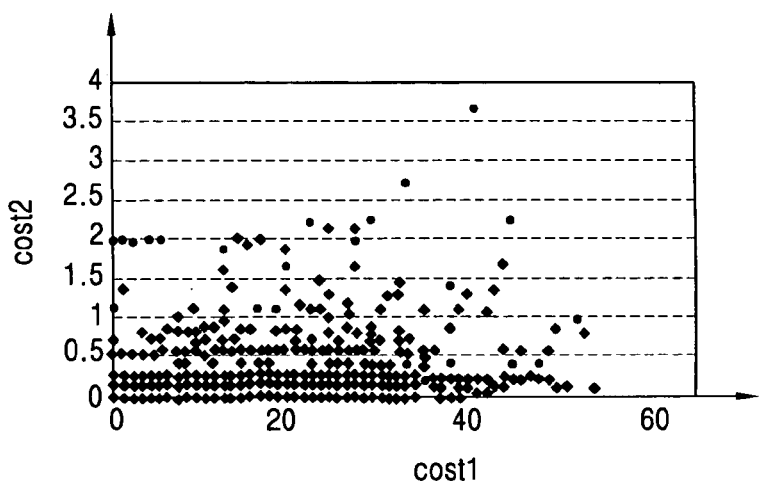
FIG. 12 is a graph showing a correlativity between the cost functions of FIGS. 11A and 11B.

FIGS. 11A and 11B are distribution charts showing costs functions of blocks having a 'no movement' characteristic; and FIG. 12 is a graph showing a correlativity between the cost functions of FIGS. 11A and 11B. As shown, the cost functions $cost_1$ and $cost_2$ are biased to small values. Most of the cost functions $cost_1$ are biased to values 25 and less, which means there is a little difference between the present frame and the previous frame. Also, a lot of data is biased to values 25 and less in the cost function $cost_2$.

Referring to FIG. 12, both of the $cost_1$ and $cost_2$ functions have small values. Thus, the judgment of the blocks having the 'no movement' characteristic is performed using the following formula 8.

$$cost_1 \leq 25, cost_2 \leq 25 \qquad \text{(formula 8)}$$

The following table 2 denotes a basis for judging a characteristic of a lost block, which was calculated by the above-noted processes. The characteristic of the lost block is determined by judging in which ranges of the corresponding cost functions $cost_1$ and $cost_2$ exist.

TABLE 2

|  | $cost_1$ | $cost_2$ |
|---|---|---|
| Scene change | $cost_1 \geq 60$ | — |
| Camera moving | $cost_1 \geq 30$ | $cost_2 \leq 50$ |
| Object moving | $cost_1 \geq 30$ | $cost_2 \geq 150$ |
| No movement | $cost_1 \leq 25$ | $cost_2 \leq 25$ |
| Otherwise | Otherwise | Otherwise |

That is, if the cost function $cost_1$ (which is the temporal difference between neighborhood pixels of the lost block) is 61 and the cost function $cost_2$ (which is the distribution value of the motion vectors adjacent to the lost block) is 50, the corresponding lost block is judged to be a macroblock having the 'scene change' characteristic. Likewise, if the $cost_1$ is 20 and the $cost_2$ is 15, the corresponding lost block is judged to be a macroblock having the 'no movement' characteristic. However, if the $cost_1$ is 20 and the $cost_2$ is 30, the corresponding lost block is judged as a macroblock having the 'otherwise' characteristic.

Also, if the $cost_1$ is 40 and the $cost_2$ is 20, the corresponding lost block is judged to be a macroblock having the 'camera moving' characteristic. However, if the $cost_1$ is 40 and the $cost_2$ is 180, the corresponding lost block is judged to be a macroblock having the 'object moving' characteristic.

Figure 13:
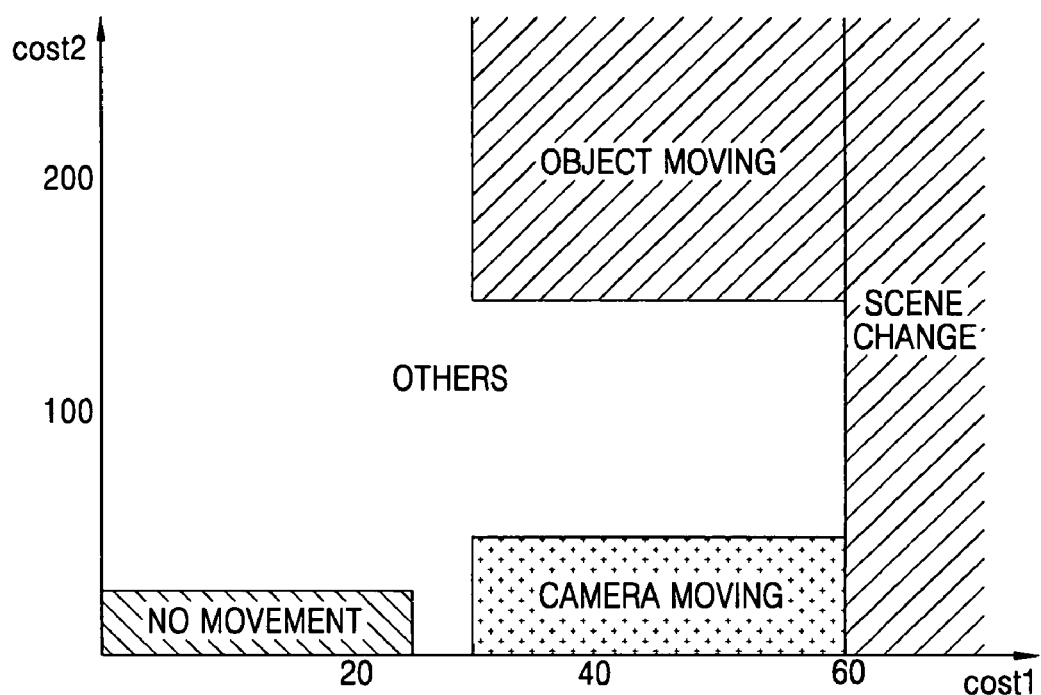
FIG. 13 is a distribution chart showing characteristics of each block defined according to the present invention.

Turning now to FIG. 13, which is a distribution chart showing characteristics of each block defined in Table 2. As shown, blocks having a small motion vector and a small difference between the present frame and the previous frame are distributed at the left bottom side, and the blocks having a large motion vector and a large difference between the present frame and the previous frame are distributed at the right upper side.

As discussed above, a scene characteristic of the lost block in a communication network where channel errors are frequent is automatically judged, and thus the scene characteristic is utilized as information for recovering the lost block, thereby reproducing a recovery image close to the original image. Also, information for the lost block is automatically judged to be applied in the video processing process which requires the information of the lost block.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art. The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A lost block characteristic determining apparatus in a video processing system, the apparatus comprising:
   a lost block detection unit for determining whether a lost block exists among transmitted video blocks;
   a pixel difference calculation unit for calculating a temporal difference $cost_1$ between neighborhood pixels of the lost block in a present frame and neighborhood pixels at same positions in a previous frame;
   a distribution value calculation unit for calculating a motion vector distribution value $cost_2$ of peripheral blocks of the lost block in the present frame; and
   a block characteristic determination unit for receiving the calculated temporal difference $cost_1$ from the pixel difference calculation unit, for receiving the calculated motion vector distribution value $cost_2$ from the distribution value calculation unit and for determining a characteristic of the lost block by comparing the received temporal difference $cost_1$ with a first preset threshold value and by comparing the received motion vector distribution value $cost_2$ with a second preset threshold value, wherein the distribution value calculation unit calculates a motion vector distribution value $cost_2$ of peripheral blocks of the lost block using the following formula:

$$cost_2 = \sum_{i=1}^{7} MV_i^2 - \left[\sum_{i=1}^{7} MV_i\right]^2$$

$$MV_i = \sqrt{MV_{ix}^2 + MV_{iy}^2}$$

wherein $MV_{ix}$ and $MV_{iy}$ denote a horizontal ingredient and a vertical ingredient of $MV_i$, respectively.

2. The apparatus of claim 1, wherein the lost block is a macroblock having a size of 16×16 pixels.

3. The apparatus of claim 1, wherein the pixel difference calculation unit calculates the temporal difference $cost_1$ between neighborhood pixels using the following formula:

$$cost_1 = \sum_{i=1}^{64} Diff_i$$

$$Diff_i = \begin{cases} 1 & \text{if } |curr_i - prev_i| \geq Threshold_{Diff} \\ 0 & \text{otherwise} \end{cases}$$

wherein $curr_i$ denotes a value of a pixel adjacent to the lost block in the present frame, and $prev_i$ denotes a value of a pixel adjacent to the lost block in the previous frame at the same position as in the present frame.

4. A lost block characteristic determining method in a video processing system for receiving and then video-processing a video signal transmitted through a communication network, the method comprising:
   calculating a first cost function of a lost block and calculating a second cost function of a lost block, wherein calculating the first cost function includes calculating a temporal difference $cost_1$ between neighborhood pixels of the lost block in a present frame and between neighborhood pixels at same positions in a previous frame, and calculating the second cost function includes calculating a motion vector distribution value $cost_2$ of peripheral blocks of the lost block in the present frame;
   comparing the calculated first cost function with a first preset threshold value;
   comparing the calculated second cost function with a second preset threshold value; and
   determining a characteristic of the lost block based on the comparison of the calculated first cost function with the first preset threshold value and based on the comparison of the calculated second cost function with the second preset threshold value, wherein the motion vector distribution value $cost_2$ is calculated using the following formula:

$$cost_2 = \sum_{i=1}^{7} MV_i^2 - \left[\sum_{i=1}^{7} MV_i\right]^2$$

$$MV_i = \sqrt{MV_{ix}^2 + MV_{iy}^2}$$

wherein $MV_{ix}$ and $MV_{iy}$ denote a horizontal ingredient and a vertical ingredient of $MV_i$, respectively.

5. The method of claim 4, wherein the lost block is a macroblock having a size of 16×16 pixels.

6. The method of claim 4, wherein the temporal difference $cost_1$ between neighborhood pixels of the lost block is calculated using the following formula:

$$cost_1 = \sum_{i=1}^{64} Diff_i$$

$$Diff_i = \begin{cases} 1 & \text{if } |curr_i - prev_i| \geq Threshold_{Diff} \\ 0 & \text{otherwise} \end{cases}$$

wherein $curr_i$ denotes a value of a pixel adjacent to the lost block in the present frame, and $prev_i$ denotes a value of a pixel adjacent to the lost block in the previous frame at a same position as in the present frame.

7. The method of claim 4, wherein determining the characteristic of the lost block comprises:
   determining the lost block is a 'no movement' block when the temporal difference $cost_1$ and the motion vector distribution value $cost_2$ are both less than or equal to a first threshold value T1;
   determining the lost block is a 'camera moving' block when the temporal difference $cost_1$ is greater than or equal to a second threshold value T2, and the motion vector distribution value $cost_2$ is less than or equal to a third threshold value T3;
   determining the lost block is a 'scene change' block when the temporal difference $cost_1$ is greater than or equal to a fourth threshold value T4; and determining the lost block is an 'object moving' block when the temporal difference $cost_1$ is greater than the second threshold value T2, and the motion vector distribution value $cost_2$ is greater than or equal to a fifth threshold value T5, wherein T1<T2<T3<T4<T5.

8. A lost block characteristic determining method in a video processing system, the method comprising:

determining whether a lost block exists among transmitted video blocks;

calculating a temporal difference $cost_1$ between neighborhood pixels of the lost block in a present frame and corresponding neighborhood pixels in a previous frame;

calculating a motion vector distribution value $cost_2$ of peripheral blocks of the lost video block in the present frame;

comparing the calculated temporal difference $cost_1$ with a first preset threshold value;

comparing the calculated motion vector distribution value $cost_2$ with a second preset threshold value; and determining a characteristic of the lost block based on a result of comparing the calculated temporal difference with the first preset threshold value and based on a result of comparing the calculated motion vector distribution value with the second preset threshold value, wherein the motion vector distribution value $cost_2$ is calculated using the following formula:

$$cost_2 = \sum_{i=1}^{7} MV_i^2 - \left[\sum_{i=1}^{7} MV_i\right]^2$$

$$MV_i = \sqrt{MV_{ix}^2 + MV_{iy}^2}$$

wherein $MV_{ix}$ and $MV_{iy}$ denote a horizontal ingredient and a vertical ingredient of $MV_i$, respectively.

9. The method of claim 8, further comprising recovering the corresponding lost block based on the determined characteristic of the lost block.

10. The method of claim 8, wherein the lost block is a macroblock having a size of 16×16 pixels.

11. The method of claim 8, wherein the temporal difference $cost_1$ between neighborhood pixels of the lost block is calculated using the following formula:

$$cost_1 = \sum_{i=1}^{64} Diff_i$$

$$Diff_i = \begin{cases} 1 & \text{if } |curr_i - prev_i| \geq Threshold_{Diff} \\ 0 & \text{otherwise} \end{cases}$$

wherein $curr_i$ denotes a value of a pixel adjacent to the lost block in the present frame, and $prev_i$ denotes a value of a pixel adjacent to the lost block in the previous frame at a same position as in the present frame.

12. The method of claim 8, wherein determining the characteristic of the lost block comprises:

determining the lost block is a 'no movement' block when the temporal difference $cost_1$ and the motion vector distribution value $cost_2$ are both less than or equal to a first threshold value T1;

determining the lost block is a 'camera moving' block when the temporal difference $cost_1$ is greater than or equal to a second threshold value T2, and the motion vector distribution value $cost_2$ is less than or equal to a third threshold value T3;

determining the lost block is a 'scene change' block when the temporal difference $cost_1$ is greater than or equal to a fourth threshold value T4; and determining the lost block is an 'object moving' block when the temporal difference $cost_1$ is greater than the second threshold value T2, and the motion vector distribution value $cost_2$ is greater than or equal to a fifth threshold value T5, wherein T1<T2<T3<T4<T5.

13. A lost block characteristic determining method in a video processing system, the method comprising:

determining a characteristic of a lost block by determining a characteristic of the lost block as a "scene change" characteristic, a "camera moving" characteristic, an "object moving" characteristic or a "no movement" characteristic; and recovering the lost block based on the determined characteristic exhibited by the lost block, wherein the "scene change" characteristic indicates the lost block has a scene conversion between frames, the "camera moving" characteristic indicates that the camera moved, the "object moving" characteristic indicates the lost block has a moving object, and the "no movement" characteristic indicates the lost block has substantially no movement, wherein determining the characteristic of the lost block comprises:

calculating a temporal difference $cost_1$ between neighborhood pixels of the lost block in a present frame and corresponding neighborhood pixels at same positions in a previous frame;

calculating a motion vector distribution value $cost_2$ of peripheral blocks of the lost video block in the present frame;

comparing the calculated temporal difference $cost_1$ with a first preset threshold value;

comparing the calculated motion vector distribution value $cost_2$ with a second preset threshold value; and determining the characteristic of the lost block based on results from comparing the calculated temporal difference with the first preset threshold value and from comparing the calculated motion vector distribution value with the second preset threshold value, wherein the motion vector distribution value $cost_2$ is calculated using the following formula:

$$cost_2 = \sum_{i=1}^{7} MV_i^2 - \left[\sum_{i=1}^{7} MV_i\right]^2$$

$$MV_i = \sqrt{MV_{ix}^2 + MV_{iy}^2}$$

wherein $MV_{ix}$ and $MV_{iy}$ denote a horizontal ingredient and a vertical ingredient of $MV_i$, respectively.

14. The method of claim 13, further comprising:

determining the characteristic of the lost block as an "otherwise" characteristic when the characteristic is not determined as any one of the "scene change," "camera moving," "object moving" or "no movement" characteristics.

15. The method of claim 13, wherein the lost block is a macroblock having a size of 16×16 pixels.

16. The method of claim 15, wherein the temporal difference $cost_1$ between neighborhood pixels of the lost block is calculated using the following formula:

$$cost_1 = \sum_{i=1}^{64} Diff_i$$

$$Diff_i = \begin{cases} 1 & \text{if } |curr_i - prev_i| \geq Threshold_{Diff} \\ 0 & \text{otherwise} \end{cases}$$

wherein $curr_i$ denotes a value of a pixel adjacent to the lost block in the present frame, and $prev_i$ denotes a value of a pixel adjacent to the lost block in the previous frame at the same position as in the present frame.

17. The method of claim 13, wherein determining the characteristic of the lost block comprises:

determining the lost block is a 'no movement' block when the temporal difference $cost_1$ and the motion vector distribution value $cost_2$ are both less than or equal to a first threshold value T1;

determining the lost block is a 'camera moving' block when the temporal difference $cost_1$ is greater than or equal to a second threshold value T2, and the motion vector distribution value $cost_2$ is less than or equal to a third threshold value T3;

determining the lost block is a 'scene change' block when the temporal difference $cost_1$ is greater than or equal to a fourth threshold value T4; and determining the lost block is a 'object moving' block when the temporal difference $cost_1$ is greater than the second threshold value T2, and the motion vector distribution value $cost_2$ is greater than or equal to a fifth threshold value T5, wherein T1<T2<T3<T4<T5.

* * * * *